Figure 1:
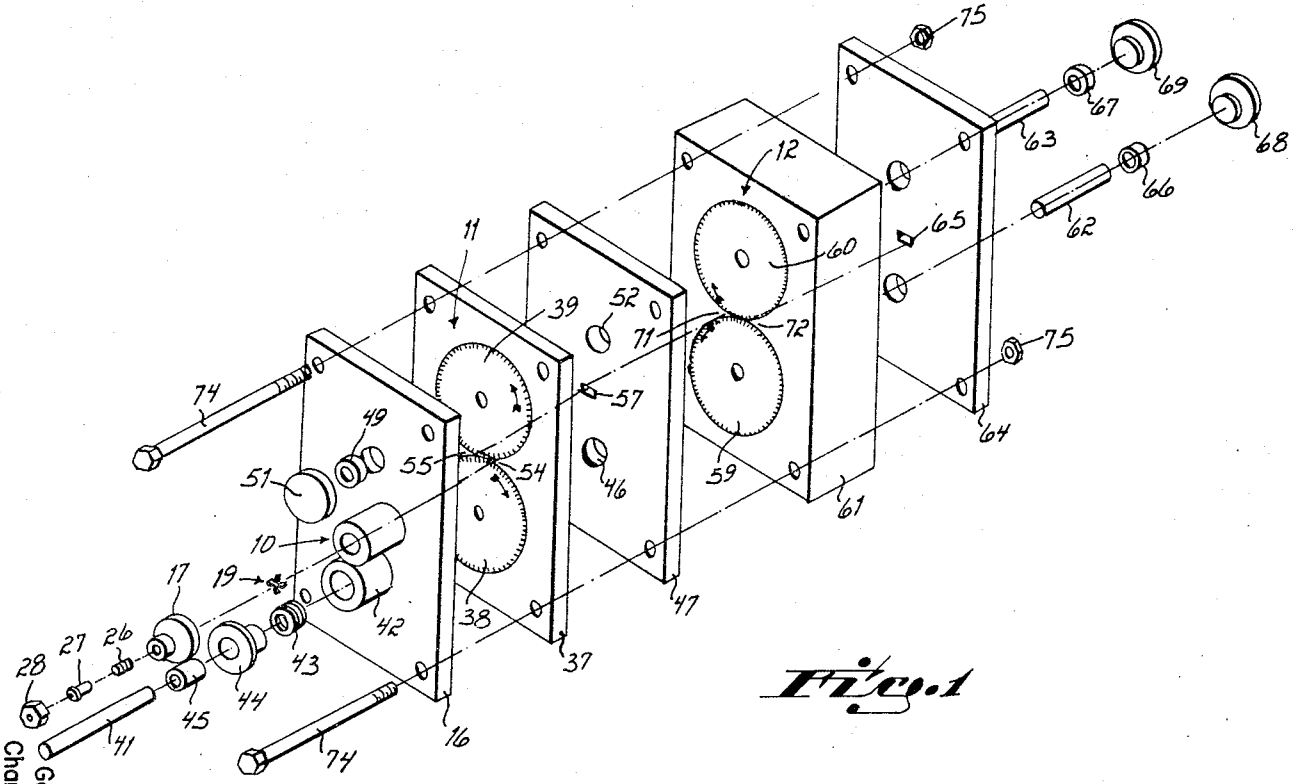
Figure 2:
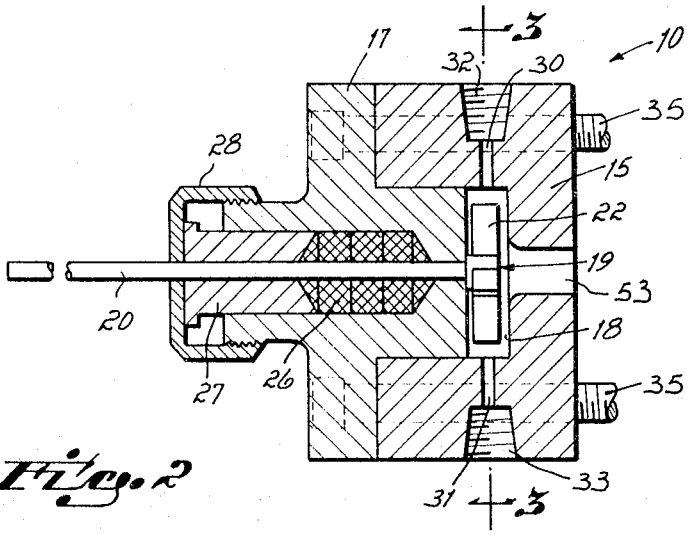
Figure 3:
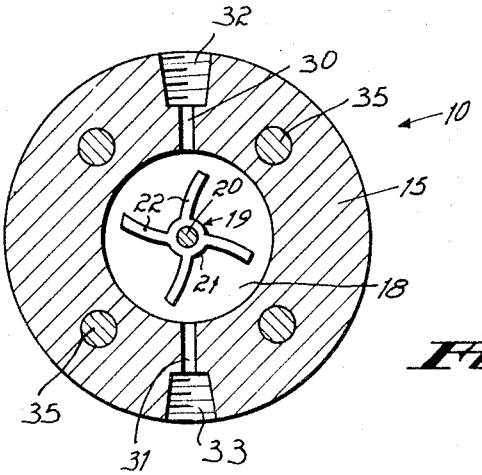

T 864006

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JULY 15, 1969

864 O.G. 730

777,421
POLYMERIZATION REACTOR FOR SPANDEX POLYMERS

Gordon W. Spangler, Charles B. Mather, and William M. McSpadden, Jr., all of P.O. Box 511, Kingsport, Tenn. 37662

Filed Nov. 20, 1968. Published July 15, 1969
Int. Cl. C08g *35/00, 22/04*
U.S. Cl. 23—285
2 Sheets Drawing. 16 Pages Specification

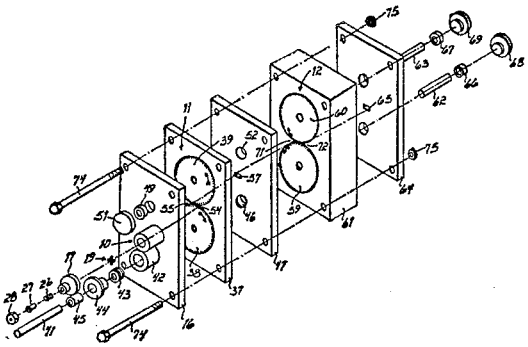

Apparatus for producing dopes of spandex polymers including a mixing chamber with at least one inlet port and at least one discharge port, mixing means within the chamber to rapidly and intimately mix the reactant solutions, and one or more holdup sections downstream of the chamber, each holdup section having a number of isolated, individual compartments which separately may be intermittently connected to the chamber's discharge port

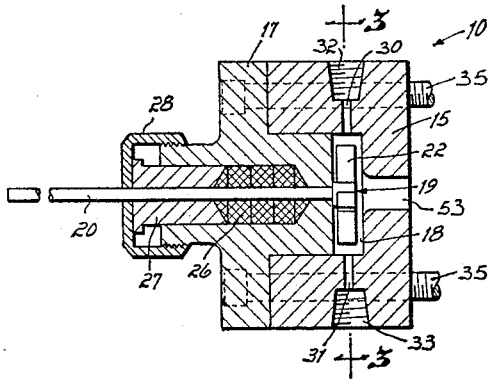

for reaction without back mixing of a reacted portion of the reactant mixture by contact with the non-reacted portion. The compartmented holdup section is designed in the shape of a rotatable gear wherein the teeth form the side walls for the rotatable separate compartments. A divider plate with a single opening forms the end plate for the separate compartments remote from the high speed mixer inlet. The single opening functions as a discharge directly to a fiber spinning machine from the holdup section or into a second holdup section for secondary treatment as determined by the product desired.

T864006

July 15, 1969 G. W. SPANGLER ET AL DEF. PUB.

POLYMERIZATION REACTOR FOR SPANDEX POLYMERS SN - 777421

Filed Nov. 20, 1968 Sheet 1 of 2

Gordon W. Spangler
Charles B. Mather
William M. McSpadden, Jr.
INVENTORS

BY William J. French
Charles L. Good
ATTORNEYS

T864006

July 15, 1969 G. W. SPANGLER ET AL DEF. PUB.

POLYMERIZATION REACTOR FOR SPANDEX POLYMERS SN - 777421

Filed Nov. 20, 1968 Sheet 2 of 2

Gordon W. Spangler
Charles B. Mather
William M. McSpadden, Jr.
INVENTORS

BY William J. French
Charles L. Good
ATTORNEYS